US008672674B2

(12) United States Patent
Kaupert et al.

(10) Patent No.: US 8,672,674 B2

(45) Date of Patent: Mar. 18, 2014

(54) BURNER

(75) Inventors: Andreas Kaupert, Esslingen (DE); Markus Münzner, Ebersbach (DE); Jörg vom Schloss, Herzogenrath (DE)

(73) Assignee: Eberspächer Climate Control Systems GmbH & Co. KG, Esslingen (DE)

(*) Notice: Subject to any disclaimer, the term of this patent is extended or adjusted under 35 U.S.C. 154(b) by 148 days.

(21) Appl. No.: 13/195,152

(22) Filed: Aug. 1, 2011

(65) Prior Publication Data

US 2012/0034540 A1 Feb. 9, 2012

(30) Foreign Application Priority Data

Aug. 6, 2010 (DE) ......................... 10 2010 039 022

(51) Int. Cl.
*F23C 5/08* (2006.01)

(52) U.S. Cl.
USPC ........... 431/179; 431/181; 431/328; 431/350; 431/354; 429/441

(58) Field of Classification Search
USPC ......... 431/179, 159, 350, 328, 354, 326, 181; 126/39 R, 41 R; 429/441
See application file for complete search history.

(56) References Cited

U.S. PATENT DOCUMENTS

| | | | | |
|---|---|---|---|---|
| 3,648,665 | A | 3/1972 | Ware | |
| 2007/0003896 | A1* | 1/2007 | Kaupert et al. ............... | 431/350 |
| 2009/0263757 | A1 | 10/2009 | Kaupert | |

FOREIGN PATENT DOCUMENTS

| | | | |
|---|---|---|---|
| DE | 20 34 352 | C2 | 2/1984 |
| DE | 102004033545 | A1 | 2/2006 |
| DE | 102005031231 | B3 | 1/2007 |
| DE | 102006010375 | A1 | 9/2007 |
| DE | 10 2008 019 854 | A1 | 10/2009 |
| DE | 102008063540 | A1 | 6/2010 |

* cited by examiner

*Primary Examiner* — Alfred Basichas

(74) *Attorney, Agent, or Firm* — McGlew and Tuttle, P.C.

(57) ABSTRACT

A burner (1) for burning a gaseous oxidant with a gaseous fuel, with a combustion chamber (2), in which the combustion reaction takes place during the operation of the burner (2), has a wall structure (4) which defines the combustion chamber (2) on the inlet side and which has oxidant openings (5) for introducing the oxidant into the combustion chamber (2) and fuel openings (6), which are separate therefrom, for introducing the fuel into the combustion chamber (2). The wall structure (4) has an oxidant distributor space (7), which is fluidically connected with the oxidant openings (5) on the outlet side and is fluidically connected with at least one oxidant feed opening (9) on the inlet side, as well as contains a fuel distributor space (8), which is fluidically separated from the oxidant distributor space (7) and is fluidically connected on the outlet side with the fuel openings (6) and is fluidically connected with at least one fuel feed opening (10) on the inlet side. A plurality of oxidant feed openings (9) are formed in the wall structure (4) on a side facing away from the combustion chamber (2), a plurality of fuel feed openings (10) are formed in the wall structure (4) on the side facing away from the combustion chamber (2), and the oxidant feed openings (9) and fuel feed openings (10) are arranged next to each other and alternating with one another in a straight connection area (11).

20 Claims, 11 Drawing Sheets

1
36
38
61
V
60
62
62
33
30
32
42
5
17
19
21
20
63
41
22
43
64
19
17
18
20
6
IV
44
62
62

1
55
36
38
61
60
62
33
30
58
32
41
2
3
62
12
59
56
57

1
38
36

50, 50"
62
33
30
16
35
31
7
40
37
49, 49'
24
50, 50'
45
32
39
54
8
4
34
47
y
x
z 1
36
38
61
60
62
62
50, 50"
64
41
42
19
17
6
5
24
25
24
18
24
10
16
10
50, 50"
10
32
54
10
26
2
3
62
27
62
4
49, 49"
50, 50"

BURNER

CROSS REFERENCE TO RELATED APPLICATIONS

This application claims the benefit of priority under 35 U.S.C. §119 of German Patent Application DE 10 2010 039 022.4 filed Aug. 6, 2010, the entire contents of which are incorporated herein by reference.

FIELD OF THE INVENTION

The present invention pertains to a burner for burning a gaseous fuel with a gaseous oxidant. The present invention pertains, in addition, to a fuel cell system, which is equipped with such a burner.

BACKGROUND OF THE INVENTION

Such a burner, which comprises a combustion chamber, in which the combustion reaction takes place during the operation of the burner, is known from DE 10 2005 031 231 B3. Furthermore, a wall structure is provided, which defines the combustion chamber on the inlet side and has oxidant openings for introducing the oxidant into the combustion chamber and fuel openings that are separate therefrom for introducing the fuel into the combustion chamber. The wall structure contains an oxidant distributor space, which is fluidically in connection with the oxidant openings on the outlet side and is fluidically in connection with an oxidant feed opening on the inlet side. Furthermore, the wall structure contains a fuel distributor space, which is fluidically separated from the oxidant distributor space and is fluidically in connection with the fuel cell openings on the outlet side and is fluidically in connection with a fuel feed opening on the inlet side. The oxidant distributor space and fuel distributor space are laterally enclosed by a common enclosing wall in the prior-art burner. The oxidant feed opening and fuel feed opening are located in this enclosing wall, so that feed lines for oxidant and fuel can be led laterally to the enclosing wall and hence laterally to the wall structure.

Another burner of this type is known from DE 10 2006 010 375 A1.

A burner with an inlet-side wall structure is likewise known from DE 10 2004 033 545 A1, wherein said wall structure forms an end plate of a stack of fuel cells.

DE 10 2008 063 540 A1 discloses a modular fuel cell system, in which a stack of fuel cells has an end plate designed as a port plate, wherein the port plate has anode gas inlet openings and cathode gas inlet openings alternating with each other in a first row, while it has, at a spaced location therefrom in a second row, anode waste gas outlet openings and cathode waste gas outlet openings alternating with one another. The port plate defines here an interface, which makes it possible to connect a fuel cell module comprising the stack of fuel cells with a burner-heat exchanger module, which comprises a residual gas burner as well as a heat exchanger for the heat-transmitting coupling of cathode gas with burner waste gas for supplying the fuel cell with preheated cathode gas.

SUMMARY OF THE INVENTION

The present invention pertains to an object of providing for a burner of the type mentioned in the introduction or for a fuel cell system equipped therewith an improved embodiment, which is characterized especially by an especially compact design and/or by a possibility of low-cost manufacture.

The present invention is based on the general idea of providing a plurality of oxidant feed openings and a plurality of fuel feed openings, which are each formed in the wall structure on a side facing away from the combustion chamber and are arranged, alternating with one another, next to each other in a straight connection area. By arranging the feed openings in a connection area, an interface can be defined, which considerably simplifies the feed of fuel and oxidant. At the same time, such an interface can be embodied at a comparatively low cost. The arrangement of the feed openings on a side of the wall structure facing away from the combustion chamber can be utilized to embody an especially compact design, doing so especially in connection with the straight connection area, because only a small installation space is needed in this manner for the connection or for the feeding of oxidant and fuel.

The connection area may be formed in a flat port plate, which simplifies the design of a compact interface. In particular, this port plate may be attached to the rest of the wall structure. In other words, the port plate is a separate component, which supports the manufacture of a defined interface and makes it possible, for example, to select a special material.

The oxidant feed openings and/or fuel feed opening may be arranged each along a straight line or along a common straight line, and they may, in particular, alternate along the common straight line. As a result, the interface has an especially simple design.

In a preferred embodiment of the burner, the oxidant distributor space and fuel distributor space may have a common partition and be separated by this from each other, namely, from the feed openings to the inlet openings. In other words, the oxidant distributor space and fuel distributor space are formed within the wall structure by the partition. The wall structure can be embodied at a comparatively low cost as a result.

The partition may have oxidant opening areas, in which the oxidant openings are arranged. Furthermore, the wall structure may have, on a side facing the combustion chamber, a separating plate, which has receiving openings for receiving the oxidant opening areas, namely, such that the oxidant openings are directly exposed to the combustion chamber. The oxidant opening areas fill out the receiving openings for this. These measures also simplify the manufacturability of the burner. For example, only the oxidant opening areas rather than every individual oxidant opening must be sealed against the partition.

Corresponding to an advantageous embodiment, the oxidant opening areas may be designed as straight strips, in which the oxidant openings are arranged along an especially straight line next to each other. The receiving openings are preferably designed now as openings complementary to the strips, so that the oxidant opening areas can be inserted into the receiving openings and close same. Furthermore, the oxidant openings may be arranged along a plurality of especially straight lines next to each other. The fuel openings may likewise be arranged along a plurality of especially straight lines next to each other. An embodiment in which the oxidant opening lines and fuel opening lines are arranged next to each other and alternate with each other is especially advantageous.

The oxidant opening areas and receiving openings are adapted such that the oxidant opening areas end aligned with the separating plate in a common plane. A continuous, flat inlet-side boundary of the combustion chamber is thus obtained by the separating plate and the oxidant opening areas of the partition, which said oxidant opening areas are recessed therein.

The strips of the oxidant opening areas may extend across, i.e., at right angles to the connection area.

Corresponding to an especially advantageous embodiment, the separating plate may have a cooling area without fuel openings, which extends at right angles to the oxidant opening areas. At least one of the oxidant opening areas extends into the cooling area and contains at least one oxidant opening acting as a cooling gas opening there. In particular, this cooling gas opening may have a different, preferably larger flow cross section than the other oxidant openings. The risk of overheating of the burner or of the burner waste gases generated can be reduced by creating such a cooling area.

Especially advantageous according to the invention is an embodiment in which a cooling wall is arranged in the combustion chamber, which said cooling wall separates a combustion space from a cooling space, extends at right angles to the oxidant opening areas and begins at and is especially in contact with the separating plate, so that only the cooling gas openings lead to the cooling space, while the other oxidant openings lead to the combustion space. The cooling wall prevents a direct contact of the combustion reaction in the combustion space with the cooling gas in the cooling space. Especially advantageous here is an embodiment in which the height of the cooling wall as measured at right angles to the separating plate is smaller than and is especially essentially half the height of the combustion chamber. Cooling gas can flow in this manner at first to the end of the cooling wall and mix with the burner waste gas only thereafter, but still within the combustion chamber, in order to effectively cool this burning waste gas. This embodiment essentially facilitates flame stabilization in the area of the fuel openings, because the air excess is reduced by bypassing a partial air flow as a cooling gas around the combustion area. This is especially advantageous for operating states with low calorific value of the fuel gas and it actually makes possible the stable operation of the burner for states with high fuel utilization in a stack of fuel cells, which may be followed downstream by the burner in a fuel cell system.

The cooling area may extend in parallel to the connection area. In addition or as an alternative, the cooling gas openings may be arranged each aligned with an oxidant feed opening. The respective direction of alignment extends at right angles to the plane of the connection area. Due to the arrangement of the cooling air openings in the area of deflection of the oxidant feed to the oxidant distribution, a substantial reduction of the dynamic pressure is, furthermore, achieved in the deflection and hence of the electric energy necessary for supplying the media.

In another advantageous embodiment, a fuel tapping port may be provided, through which fuel can be tapped from the fuel distributor space. Such an embodiment is especially advantageous if the burner is used as a residual gas burner for a fuel cell of a fuel cell system. As a result, anode waste gas can be tapped via the fuel tapping port in order to make it possible, for example, to return this anode waste gas to a reformer of the fuel cell system.

The fuel tapping port may be fluidically connected with a plurality of tapping areas of the fuel distributor space, which are each fluidically connected with at least one fuel feed opening. This leads to uniform tapping of the fuel. Furthermore, provisions may be made for the fuel tapping port to have a collector housing, which is attached laterally to the wall structure and has a tapping tube. The fuel tapped thus reaches, especially from a plurality of tapping areas, the collector housing and from there the common tapping tube.

The collector housing of the fuel tapping port preferably extends in parallel to the connection area.

In addition or as an alternative, a cooling gas feed port may be provided, through which cooling gas, especially oxidant gas, can be fed to the oxidant distributor space. In other words, the burner can be supplied in this embodiment with oxidant gas not only via the oxidant feed openings, but additionally also via the cooling gas feed port, which makes possible a separate feeding of cooling gas, which is preferably oxidant gas.

The cooling gas port may be fluidically in connection with a plurality of feed areas of the oxidant distributor space, which are each in fluidic connection with at least one oxidant feed opening. The most homogeneous introduction of the cooling gas possible can be achieved hereby as well. The cooling gas feed port may optionally have a feed tube, which passes through a lateral boundary of the wall structure and which has, in the oxidant distributor space, a feed section, which has at least one opening that is fluidically in connection with the oxidant distributor space. While the above-described fuel tapping port is mounted externally, i.e., from the outside, the cooling gas feed port is mounted in this embodiment internally, i.e., in the interior of the wall structure, namely, in the oxidant distributor space.

The feed section of the feed tube of the cooling gas feed port may advantageously extend in parallel to the connection area.

The combustion chamber may be defined on the outlet side by an end plate, which is attached to the rest of the wall structure and which has an open area with at least one waste gas outlet opening as well as a closed area. The closed area without waste gas outlet opening is preferably aligned with the cooling space, while the open area of the end plate containing the at least one exhaust gas outlet opening is arranged aligned with the combustion space. Mixing of the cooling gas with the burner waste gas is supported hereby before the mixture leaves the combustion chamber through the exhaust gas outlet opening.

In addition or as an alternative, at least one flow guide element, which guides the gas flow in the combustion chamber from a combustion chamber wall laterally enclosing the combustion chamber towards the inside and/or against the direction of gas flow, may be arranged in the combustion chamber according to another embodiment. The respective flow guide element may advantageously begin for this at the combustion chamber wall or at an end plate defining the combustion chamber in the direction of gas flow and, starting from this, project inwardly and against the direction of gas flow. In particular, such a flow guide element may be arranged in the area of the cooling space in order to guide the cooling gas from the combustion chamber wall towards the inside, in the direction of the combustion space. In addition or as an alternative, such a flow guide element may be arranged in the area of the combustion space in order to guide the waste gas from the combustion chamber wall to the inside. Both a cooling space-side flow guide plate and a combustion space-side flow guide plate, which guide the cooling gas flow and the exhaust gas flow towards each other, which supports intensive mixing, may now be provided in an especially advantageous manner. The two flow guide elements may preferably have the same appearance. In particular, the two flow guide elements may thus diverge in the gas flow direction.

On a side facing away from the combustion chamber, the wall structure may have a bottom plate, which is attached to the rest of the wall structure and defines the oxidant distributor space. This simplifies the embodiment of the wall structure with distributor spaces located on the inside. In particular, the bottom plate may be attached to the partition, which separates the two distributor spaces from each other.

Corresponding to another, especially advantageous embodiment, the wall structure, in relation to an X-Y-Z system of coordinates, which has an X axis, a Y axis and a Z axis, a duct system with X ducts extending in parallel to the X axis, with Y ducts extending in parallel to the Y axis and with Z ducts extending in parallel to the Z axis. First X ducts are fluidically connected with the oxidant openings, while second X ducts are fluidically connected with the fuel openings. Furthermore, first Z ducts are fluidically connected with the oxidant feed openings, while second Z ducts are fluidically connected with the fuel feed openings. Furthermore, a first Y duct is used to fluidically connect the first X ducts with the first Z ducts, while a second Y duct fluidically connects the second X ducts with the second Z ducts. In other words, the oxidant enters the first Z ducts via the oxidant feed openings, enters through these the first Y duct, from which the first X ducts originate and lead to the oxidant openings. The fuel enters via the fuel feed openings the second Z ducts and enters through these the second Y duct. The second X ducts, which lead to the fuel openings, originate from the second Y duct.

The X ducts, Y ducts and Z ducts especially advantageously extend essentially at right angles to one another in the manner of a Cartesian system of coordinates. This means that the longitudinal axes of the X ducts extend in parallel to one another and at right angles to the longitudinal axes of the Y ducts and Z ducts. The longitudinal axes of the Y ducts also extend in parallel to one another and at right angles to the longitudinal axes of the X ducts and Z ducts. Finally, the longitudinal axes of the Z ducts also extend in parallel to one another and at right angles to the longitudinal axes of the X ducts and Y ducts.

Preferred is an embodiment in which the X ducts are located in a connection section of the wall structure extending over the entire cross section of the combustion chamber, while the Z ducts are arranged in a connection section, which extends only over a part, especially over at most half of the cross section of the combustion chamber. In particular, the fuel tapping port mentioned farther above may be arranged at this connection section. In addition or as an alternative, the cooling gas feed section mentioned farther above may be arranged at this connection section.

Through the duct system being proposed here, the gases fed can be sent with comparatively low flow resistances to the inlet openings, i.e., to the fuel openings and oxidant openings, including the cooling gas openings that are possibly present.

Corresponding to an advantageous embodiment, the first and second X ducts may be separated from one another by a bicurve section of the partition, which said section is located in a section plane, which extends at right angles to the direction of the X ducts. In addition or as an alternative, the first and second Z ducts may be separated from one another by a bicurve section of the partition, which said section lies in a section plane, which extends at right angles to the direction of the Z ducts. In other words, the partition has a bicurve section in the area of the X ducts in order to separate the oxidant-side first X ducts from the fuel-side second X ducts. In addition or as an alternative, this partition may have a bicurve section in the area of the Z ducts in order to separate the oxidant-side first Z ducts from the fuel-side second Z ducts. The duct system can be embodied at an especially low cost due to the proposed embodiment of the partition, which is, e.g., a casting.

The burner being presented here may be used within a fuel cell system as a residual gas burner to burn unreacted anode gas, i.e., anode waste gas, with unreacted cathode gas, i.e., cathode waste gas. Such a fuel cell system comprises a fuel cell, which has a stack of individual fuel cell elements as well as a port plate defining the stack. The port plate has anode waste gas outlet openings and cathode waste gas outlet openings. The burner is attached to this port plate of the fuel cell stack. The feed openings of the burner are arranged complementarily to the outlet openings of the fuel cell, such that the oxidant feed openings are fluidically connected with the cathode waste gas outlet openings and the fuel feed openings are fluidically connected with the anode waste gas outlet openings.

It is obvious that the above-mentioned features, which will also be described below, can be used not only in the particular combination indicated, but in other combinations or alone as well without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
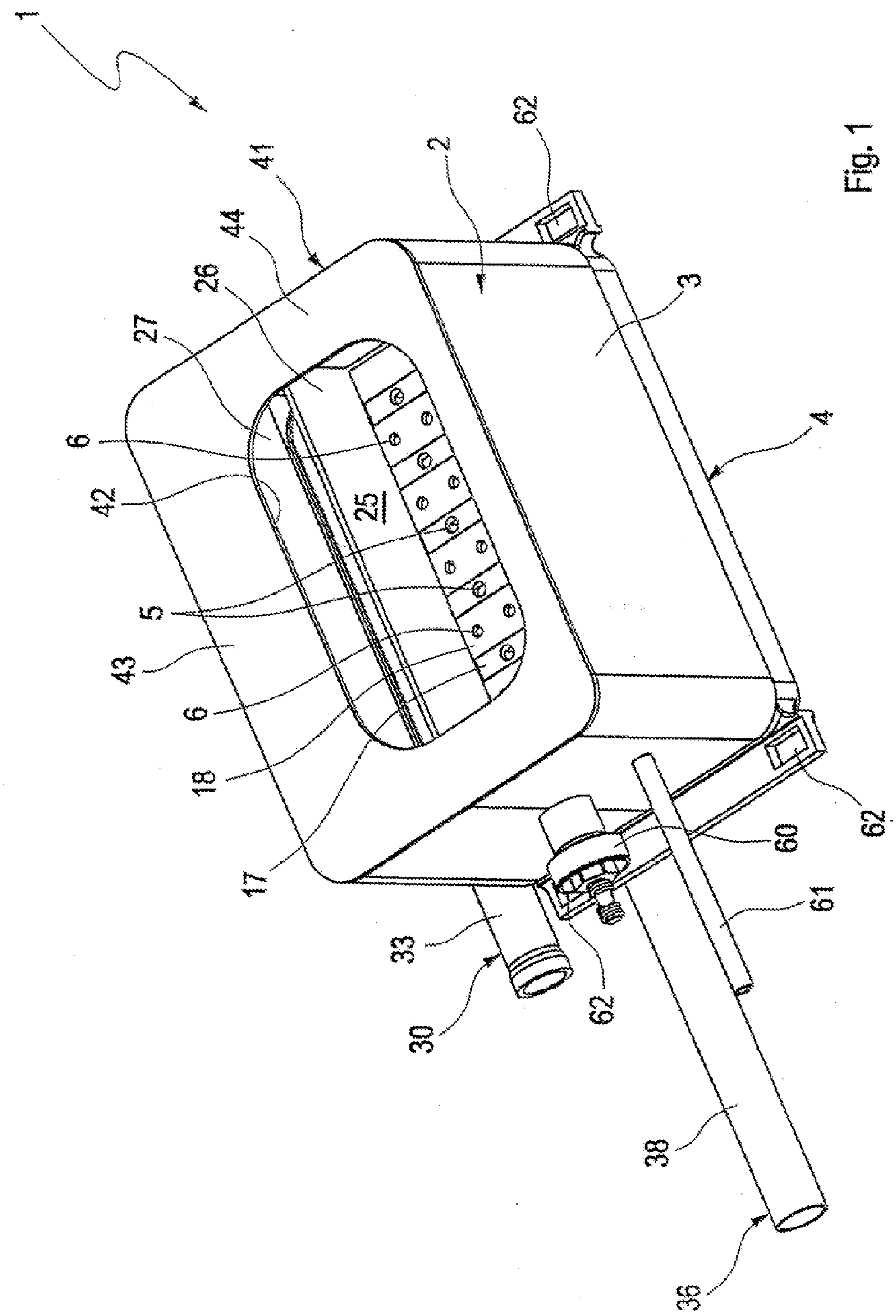
FIG. 1 is a perspective view of a burner.

Referring to the drawings in particular, corresponding to FIGS. 1-10, a burner 1, which is suitable for burning a gaseous oxidant with a gaseous fuel, comprises a combustion chamber 2, which is laterally enclosed by a combustion chamber wall 3. The combustion reaction takes place during the operation of the burner 1 within this combustion chamber 2. The combustion chamber 2 is defined on the inlet side by a wall structure 4, which has oxidant openings 5, via which the oxidant can be introduced into the combustion chamber 2, as well as fuel openings 6, which are separated therefrom and via which the fuel can be introduced into the combustion chamber 2. The fuel and oxidant are thus introduced into the combustion chamber 2 separately via separate inlet openings 5, 6, so that the mixing of oxidant and fuel takes place only within the combustion chamber 2. The oxidant openings 5 each have a larger flow cross section in the example compared to the fuel openings 6.

Corresponding to FIGS. 6-10, the wall structure 4 contains an oxidant distributor space 7 and a fuel distributor space 8, which is fluidically separated from the oxidant distributor space 7. The oxidant distributor space 7 is fluidically connected on the outlet side with the oxidant openings 5. The oxidant distributor space 7 is fluidically connected on the inlet side with a plurality of oxidant feed openings 9. The fuel distributor space 8 is correspondingly fluidically connected with the fuel openings 6 on the outlet side and is fluidically connected with a plurality of fuel feed openings 10 on the inlet side. Exactly three oxidant feed openings 9 and exactly four fuel feed openings 10 are provided in the example without limitation of the general nature.

As can be seen, the feed openings 9, 10 are located on a side of the wall structure 4 facing away from the combustion chamber 2.

The feed openings 9, 10 are arranged next to each other in a straight connection area 11, such that oxidant feed openings 9 and fuel feed openings 10 alternate with each other. The connection area 11 comprises in the example a flat port plate 12, which contains the feed openings 9, 10. In particular, this port plate 12 forms, in relation to the rest of the wall structure 4, a separate component, so that it is attached to the rest of the wall structure 4, especially in a gas-tight manner, e.g., soldered or welded. An integral design is also conceivable, in which the port plate 12 or the connection area 11 is made integrally in one piece with the wall structure 4.

Figure 7:
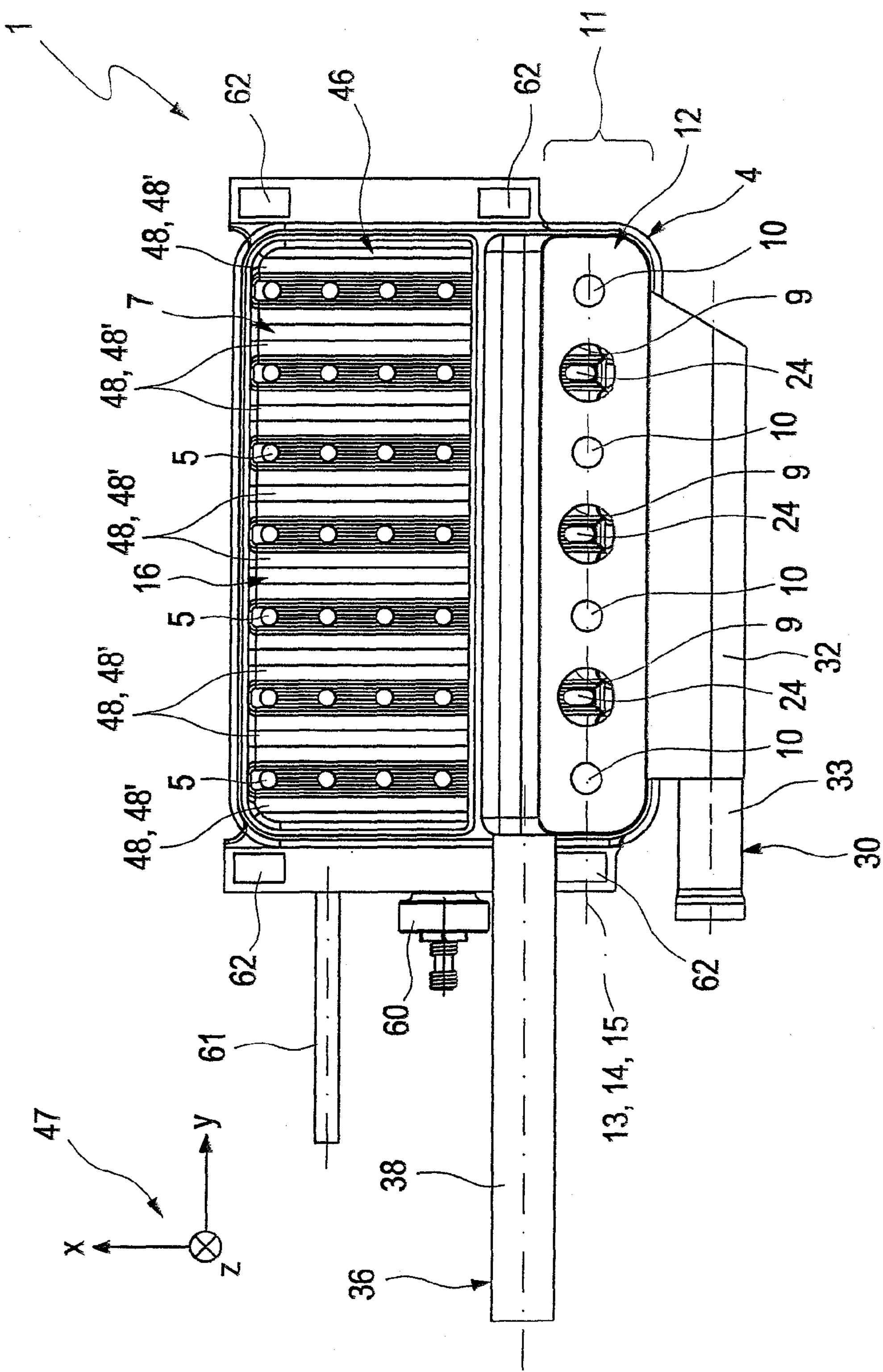
FIG. 7 is a bottom view of the wall structure without bottom plate.

In the example being shown, the oxidant feed openings 9 are arranged according to FIG. 7 along a straight line 13. The fuel feed openings 10 are likewise arranged along a straight line 14. The two lines 13, 14 coincide in the example, so that the oxidant feed openings 9 and fuel feed openings 10 are arranged along a common straight line 15, namely such that they alternate along this line 15.

According to FIGS. 7 through 10, the wall structure 4 has a partition 16, which is jointly associated within the wall structure 4 with the oxidant distributor space 7 and the fuel distributor space 8, so that both distributor spaces 7, 8 are defined by this common partition 16. Furthermore, the two distributor spaces 7, 8 are separated by this partition 16 from one another from the feed openings 9, 10 up to the inlet openings 5, 6. In other words, the partition 16 makes it possible to guide the gases within the wall structure 4 from the feed openings 9, 10 up to the inlet openings 5, 6 in such a way that the media are separated from each other.

Partition 16 may have oxidant opening areas 17 for this purpose, in which the oxidant openings 5 are arranged. According to FIGS. 1 and 2, the wall structure 4 has a separating plate 18 on a side facing the combustion chamber 2. The separating plate 18 contains receiving openings 19, which receive the oxidant opening areas 17. In other words, the respective oxidant opening area 17 meshes with such a receiving opening 19 each. The oxidant opening areas 17 are arranged here in the receiving openings 19 such that the oxidant openings 5 are directly exposed to the combustion chamber 2. Furthermore, the oxidant opening areas 17 and receiving openings 19 passing through the separating plate 18 are coordinated with one another such that the respective oxidant opening area 17 fills out and closes the respective receiving opening 19.

The separating plate 18 is used, in addition, to define the fuel distributor space 8. Furthermore, the separating plate 18 contains the fuel openings 6.

Figure 2:
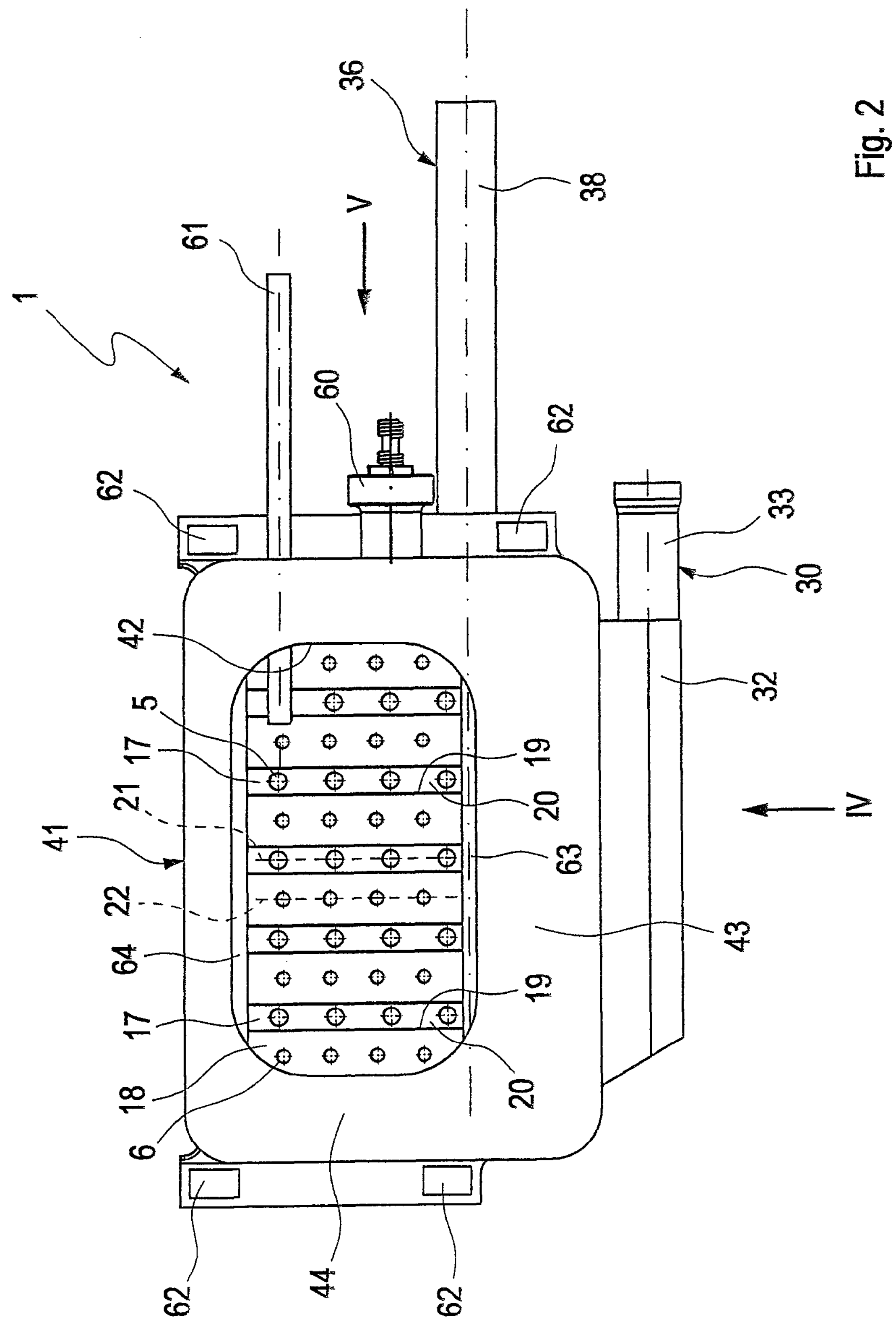
FIG. 2 is a top view of the burner.

The oxidant opening areas 17 may now be advantageously designed as straight strips 20, in which the oxidant openings 5 are located, namely, such that they are arranged next to each other along a preferably straight line. FIG. 2 shows an example of such a line 21, along which the oxidant openings 5 are arranged next to each other. The receiving openings 19 advantageously have a shape complementary to that of the strips 20, so that the strips 20 can be inserted into the receiving opening 19 in an accurately fitting manner. In particular, the strips 20 may end aligned with a separating plate 18 in a common plane. The oxidant opening areas 17 may preferably have a shoulder having a step-like profile each, at which the separating plate 18 is in contact with the area of the receiving openings 19 such that both components (separating plate 18 and partition 16) end aligned on the side facing the combustion chamber 2 and can be connected with one another at this shoulder in a gas-tight manner, e.g., by soldering or welding.

The oxidant openings 5 are thus preferably arranged next to each other along a plurality of straight lines 21, and a plurality of such oxidant opening lines 21 may be arranged at spaced locations from one another and in parallel to one another. The fuel openings 6 may correspondingly also be organized in such lines, so that they extend along a plurality of especially straight lines next to each other. Such a line 22 is indicated as an example in FIG. 2. If a plurality of such fuel opening lines 22 are provided, they are arranged in parallel to each other and at spaced locations from one another. In particular, the oxidant opening lines 21 and the fuel opening line 22 may be arranged alternatingly with one another and extend in parallel to one another.

Figure 9:
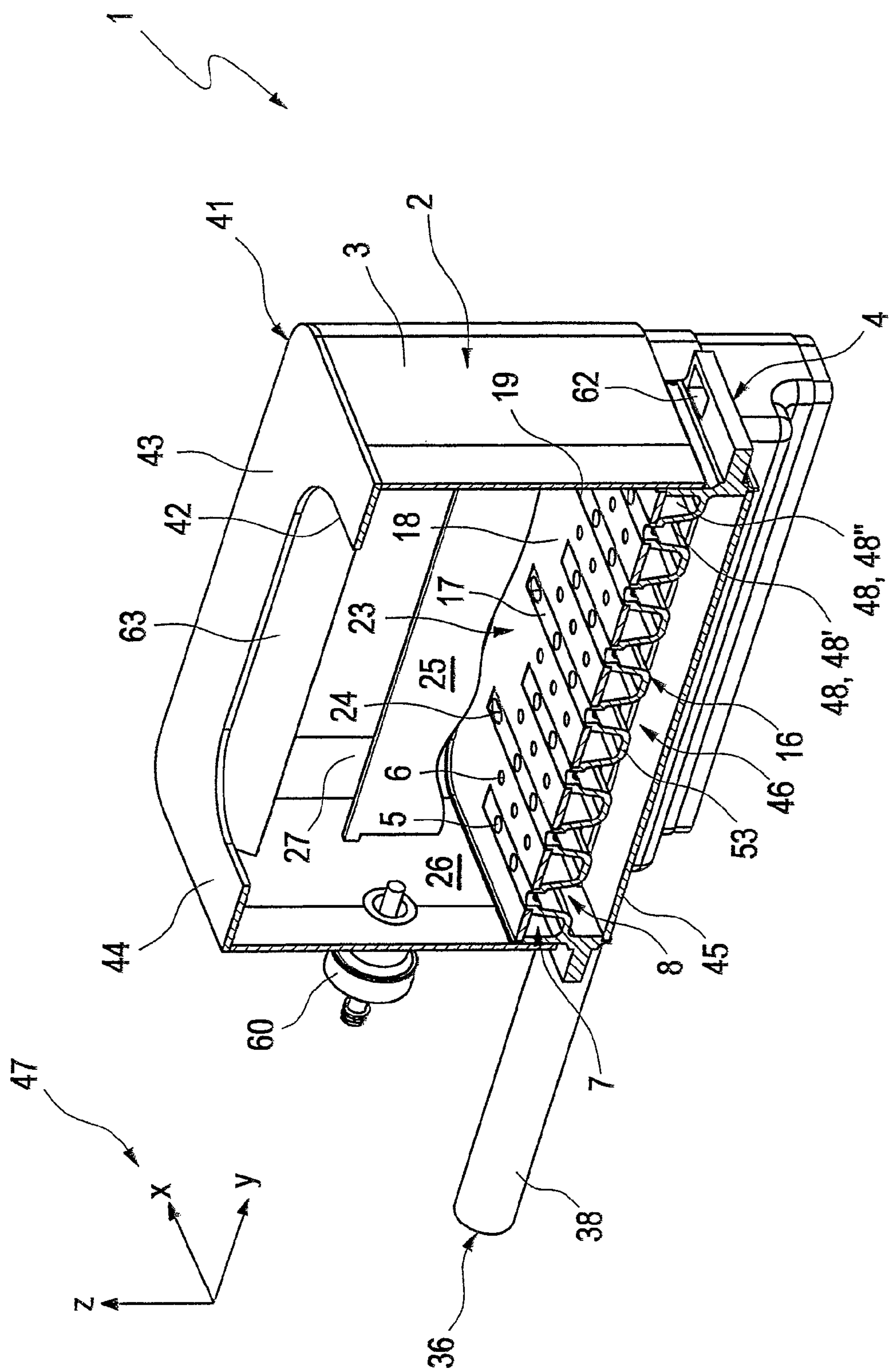
FIG. 9 is a perspective sectional view of the burner in the area of the combustion space.
Figure 10:
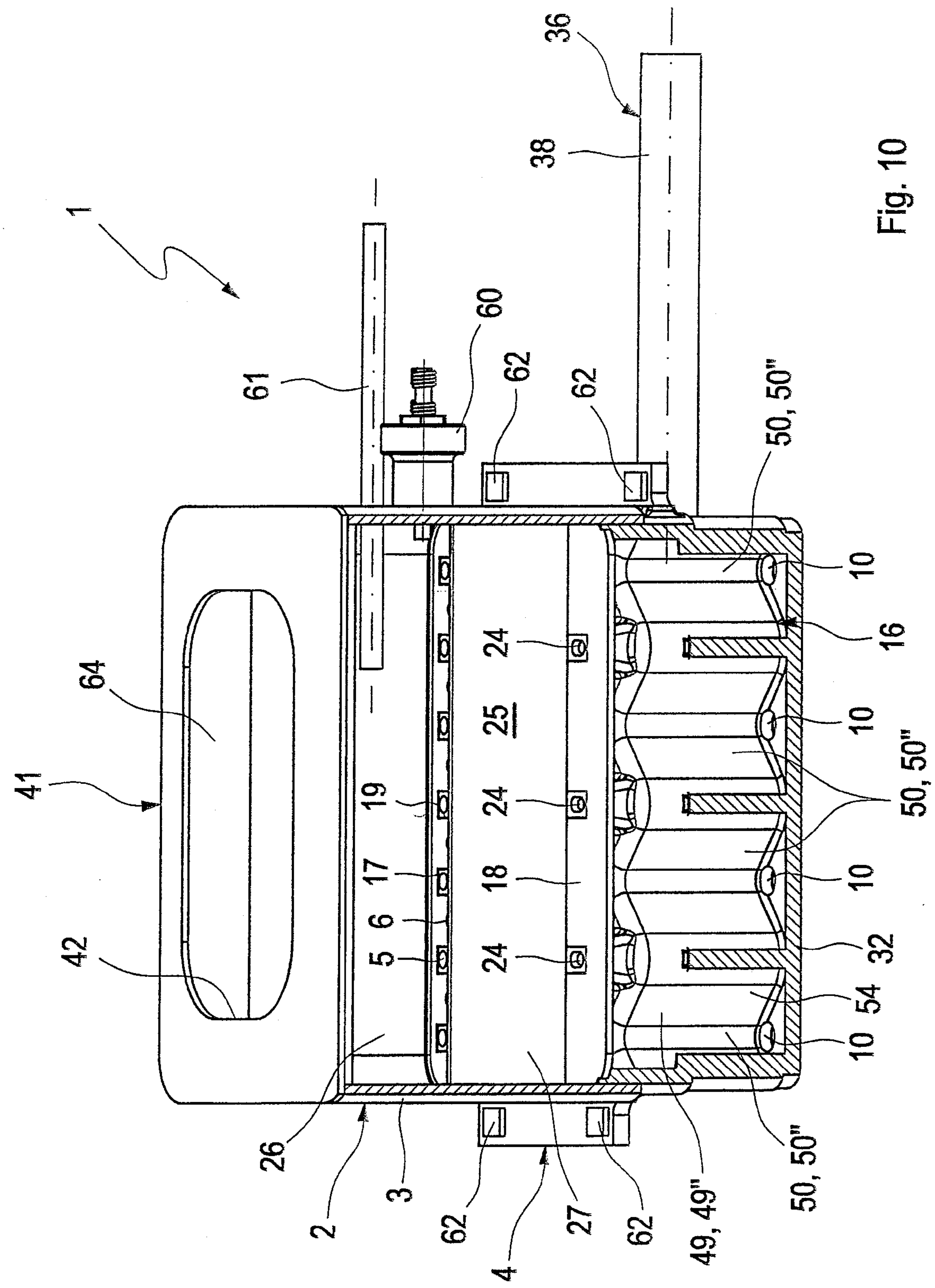
FIG. 10 is a perspective sectional view of the burner in the area of a cooling space.

According to FIGS. 9 and 10, the separating plate 18 may have a cooling area 23, which is characterized in that it contains no fuel openings 6. Furthermore, the cooling area 23 extends at right angles to the oxidant opening areas 17. A plurality of oxidant opening areas 17 extend in the example up into the cooling area 23, such that the oxidant opening areas 17 in the cooling area 23 have at least one oxidant opening 5, which is used as a cooling gas opening 24. The corresponding cooling gas opening 24 may have a different, especially larger flow cross section than the rest of the oxidant openings 5. In addition, a cooling wall 25 may be arranged in the combustion chamber 2. The cooling wall 25 separates a combustion space 26 from a cooling space 27 in the combustion chamber 2. The cooling wall 25 extends for this at right angles to the oxidant opening areas 17. Furthermore, it begins at the separating wall 18 and may be in contact therewith, and it is positioned in relation to the separating plate 18 such that only the cooling gas openings 24 lead to the cooling space 27, whereas all the other oxidant openings 5 as well as all fuel openings 6 lead to the combustion space 26. The cooling wall 25 does not advantageously extend in this case over the entire height of the combustion chamber 2. A height 28 of the cooling wall 25 measured at right angles to the separating plate 18 is thus smaller than a height 29 of the combustion chamber 2 measured at right angles to the separating plate 18. The height 28 of the cooling wall is especially about one third to about half of the height 29 of the combustion chamber. A mixing space is formed hereby above the combustion space 26 and the cooling space 27. FIG. 9 shows the cooling wall 25 in the lower area in a cut-away form for the sake of better illustration only.

As can be determined especially from FIGS. 1, 2, 9 and 10, the strips 20 extend at right angles to the connection area 11.

Furthermore, the cooling area 23 of the partition 18 extends in parallel to the connection area 11.

Figure 8:
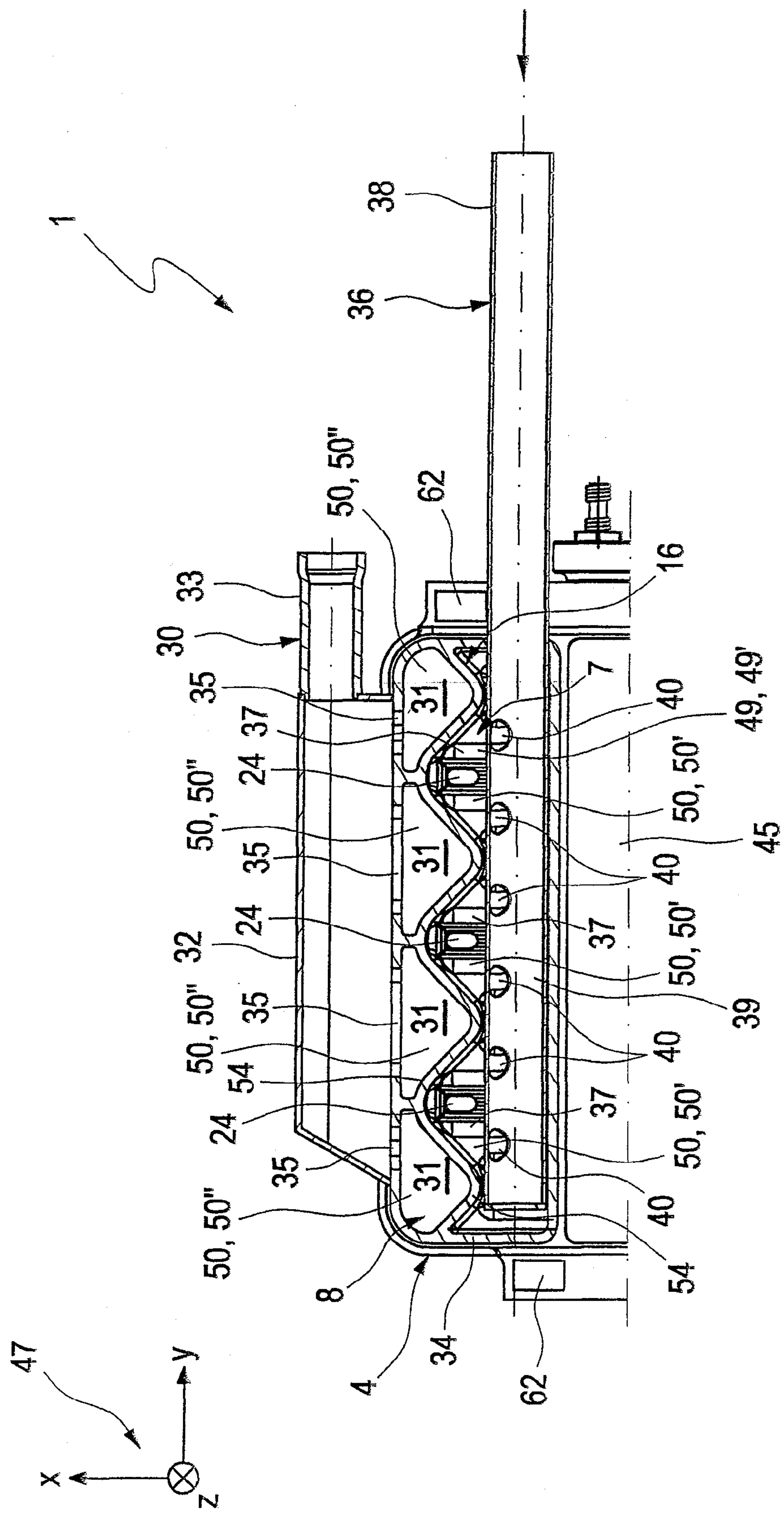
FIG. 8 is a sectional view of the wall structure in the area of the connection section.

According to FIG. 8, a fuel tapping port 30 may be provided, through which fuel can be tapped from the fuel distributor space 8. The fuel tapping port 30 may be fluidically connected for this with a plurality of tapping areas 31 of the fuel distributor space 8. Each tapping area 31 is fluidically connected here with at least one of the fuel feed openings 10. Exactly one separate fuel feed opening 10 is associated with each tapping area 31 in the example. Furthermore, the fuel tapping port 30 comprises a collector housing 32, which is attached laterally to the wall structure 4 and from which a tapping tube 33 originates. A lateral boundary 34 of the wall structure 4 contains a plurality of passage openings 35, which fluidically connect one of the tapping areas 31 with the interior of the collector housing 32. Thus, fuel can enter the collector housing 32 from the tapping areas 31 and be fed from said collector housing to the common tapping tube 33.

Furthermore, a cooling gas feed port 36 may be provided, through which a cooling gas, preferably oxidant gas, can be fed to the oxidant distributor space 7. The cooling gas feed port 36 may be fluidically connected for this with a plurality of feed areas 37, which may be provided within the oxidant distributor space 7. Each feed area 37 may be fluidically connected here with at least one oxidant feed opening 9. Exactly one oxidant feed opening 9 is provided for each feed area 37 in the example. Furthermore, the cooling gas feed port 36 comprises in the embodiment being shown here a feed tube 38, which passes through the lateral boundary 34 of the wall structure 4 and has a feed section 39 in the interior of the wall structure 4, namely, in the oxidant distributor space 7. This feed section 39 contains at least one opening 40, which fluidically connects the interior of the feed tube 38 with the oxidant distributor space 7.

According to FIG. 7, the cooling gas openings 24 are arranged aligned with an oxidant feed opening 9 each, the direction of alignment being oriented at right angles to the plane of the connection area 11. The collector housing 32 of the fuel tapping port 30 and/or feed tube 38 or feed section 39 of the cooling gas feed port 36 may also advantageously extend in parallel to the connection area 11.

Corresponding to FIGS. 1, 2 and 10, the combustion chamber 2 is defined on its outlet side, i.e., on its side facing away from the wall structure 4, by an end plate 41, which has at least one waste gas outlet opening 42 as well as a closed area 43, which contains no waste gas outlet opening. The open area 43 is arranged aligned with the cooling space 27. Contrary to this, an open area 44 of the end plate 41 is arranged aligned with the combustion space 26. The closed area 44 contains the at least one waste gas outlet opening 42. Only a single, large-area waste gas outlet opening 42, which extends over an essential part of the open area 44, is provided in the example. Due to this design of the end plate 41, the cooling gas is deflected from the cooling space 27 into the area of the combustion space 26 or into the aforementioned mixing space, so that the cooling gas can mix with the burner waste gas before this is discharged from the combustion chamber 2 through the waste gas outlet opening 42. The end plate 41 is attached here to the lateral combustion chamber wall 3, preferably in a gas-tight manner, e.g., by means of a welded connection or a soldered connection.

Figure 11:
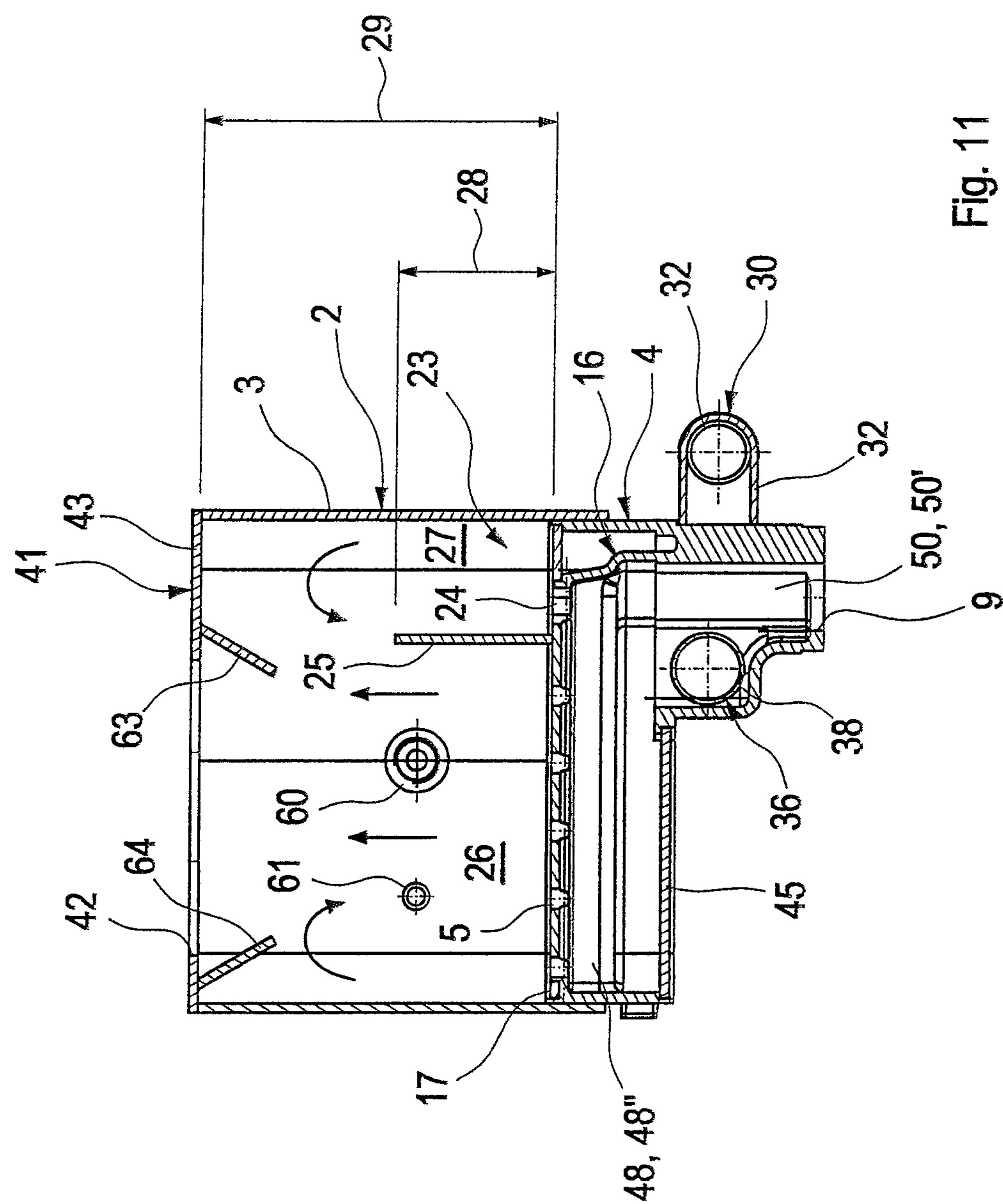
FIG. 11 is a cross sectional view of the burner.

As can be seen especially from the cross section in FIG. 11, the burner 1 may be arranged at least one flow guide element, such as guide elements 63, 64, in the combustion chamber 2, which said flow guide element guides the gas flow in the combustion chamber 2 from the combustion chamber wall 3 laterally enclosing the combustion chamber 2 to the inside and against the direction of gas flow. The respective flow guide element 63, 64 may advantageously begin for this at the combustion chamber wall 3 or, as in the example being shown, at the end plate 41 defining the combustion chamber 2 in the direction of gas flow and, starting therefrom, project inwardly and against the direction of gas flow. In particular, a first flow guide element 63 may be arranged in the area of the cooling space 27 in order to guide the cooling gas from the combustion chamber wall 3 to the inside, in the direction of the combustion space 26. In addition or as an alternative, a second flow guide element 64 may be arranged in the area of the combustion space 26 to guide the waste gas from the combustion chamber wall 3 to the inside. Both a cooling space-side first flow guide plate 63 and a second, combustion space-side flow guide plate 64 are especially advantageously provided here, which guide the cooling gas flow and waste gas flow towards each other, which supports intensive mixing. The two flow guide elements 63, 64 have the same appearance. However, the two flow guide elements 63, 64 differ in profile in the direction of gas flow.

Figure 3:
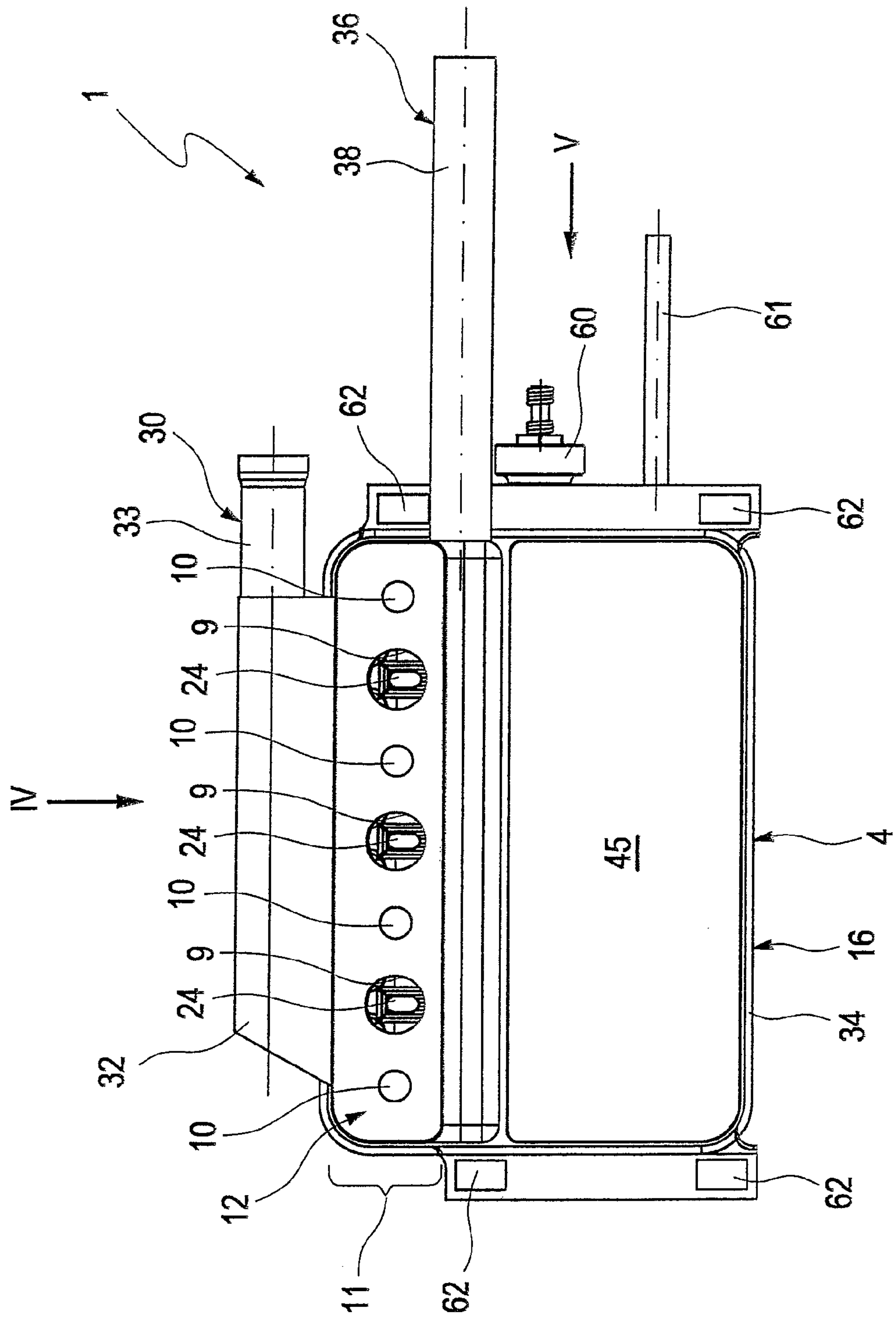
FIG. 3 is a bottom view of the burner.

Corresponding to FIGS. 3 and 9, the wall structure 4 may have, on the side facing away from the combustion chamber 2, a bottom plate 45, which is attached to the rest of the wall structure 4, especially to the lateral boundary 34 thereof. This bottom plate 45 defines the oxidant distributor space 7. The bottom plate 45 may also be rigidly connected with the partition 16, especially if the partition 16 is made integrally in one piece with the lateral boundary 34 of the wall structure 4.

In the preferred embodiment according to FIGS. 6 through 10, which is being shown here, wall structure 4 contains a duct system 46, which is built corresponding to an X-Y-Z system of coordinates 47, especially according to a Cartesian system of coordinates 47. The system of coordinates 47 has an X axis x, a Y axis y and a Z axis z, which are at right angles to each other in the Cartesian system of coordinates 47. Duct system 46 has a plurality of X ducts 48 extending in parallel to the X axis x, a plurality of Y ducts 49 extending in parallel to the Y axis y, and a plurality of Z ducts 50 extending in parallel to the Z axis z. First X ducts 48' are fluidically connected with the oxidant openings 5, while second X ducts 48" are fluidically connected with the fuel openings 6. Furthermore, first Z ducts 50' are fluidically connected with the oxidant feed openings 9, while second Z ducts 50" are fluidically connected with the fuel feed openings 10. Furthermore, a first Y duct 49" fluidically connects the first Z ducts 50' with the first X ducts 48'. A second Y duct 49" fluidically connects the second Z ducts 50" with the second X ducts 48".

The X ducts 48 extend here in a connection section 51 of the wall structure 4, which extends over the entire cross section of the combustion chamber 2. Contrary to this, the Z ducts are located in a connection section 52 of the wall structure 4, which connection section extends only over a part of the cross section of the combustion chamber 2. The connection section 52 extends over less than half of the height cross section of the combustion chamber 2 in the example shown in FIG. 5. As can be seen, the fuel tapping connection 30 and cooling gas feed port 36 are preferably located in this connection section 52.

As can be determined from FIG. 9, the first X ducts 48' and second X ducts 48" are separated from one another by a bicurve section 53 of the partition 16, said bicurve section 53 extending in a section plane, which extends at right angles to the direction of the X ducts 48, i.e., in parallel to a Y-Z plane. According to FIG. 8, the first Z ducts 50' and second Z ducts 50" may also be separated from each other by a bicurve section 54 of the partition 16, wherein said bicurve section 54 extends in a section plane that extends at right angles to the direction of the Z ducts 50, i.e., in parallel to an X-Y plane.

Figure 4:
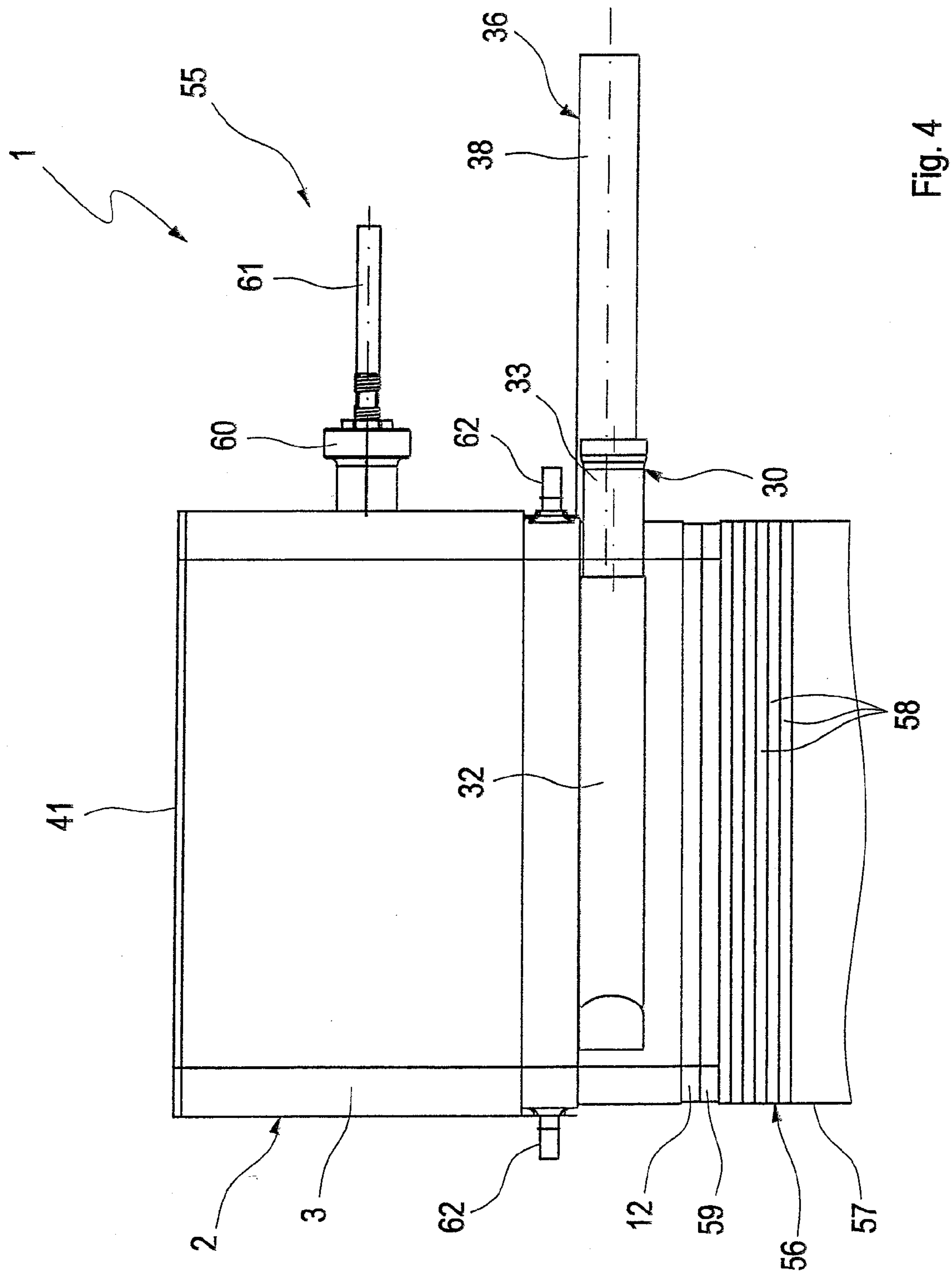
FIG. 4 is a side view of the burner corresponding to a direction of view IV in FIGS. 2 and 3 and also showing a fuel cell 56 formed by a stack of individual fuel cell elements.
Figure 5:
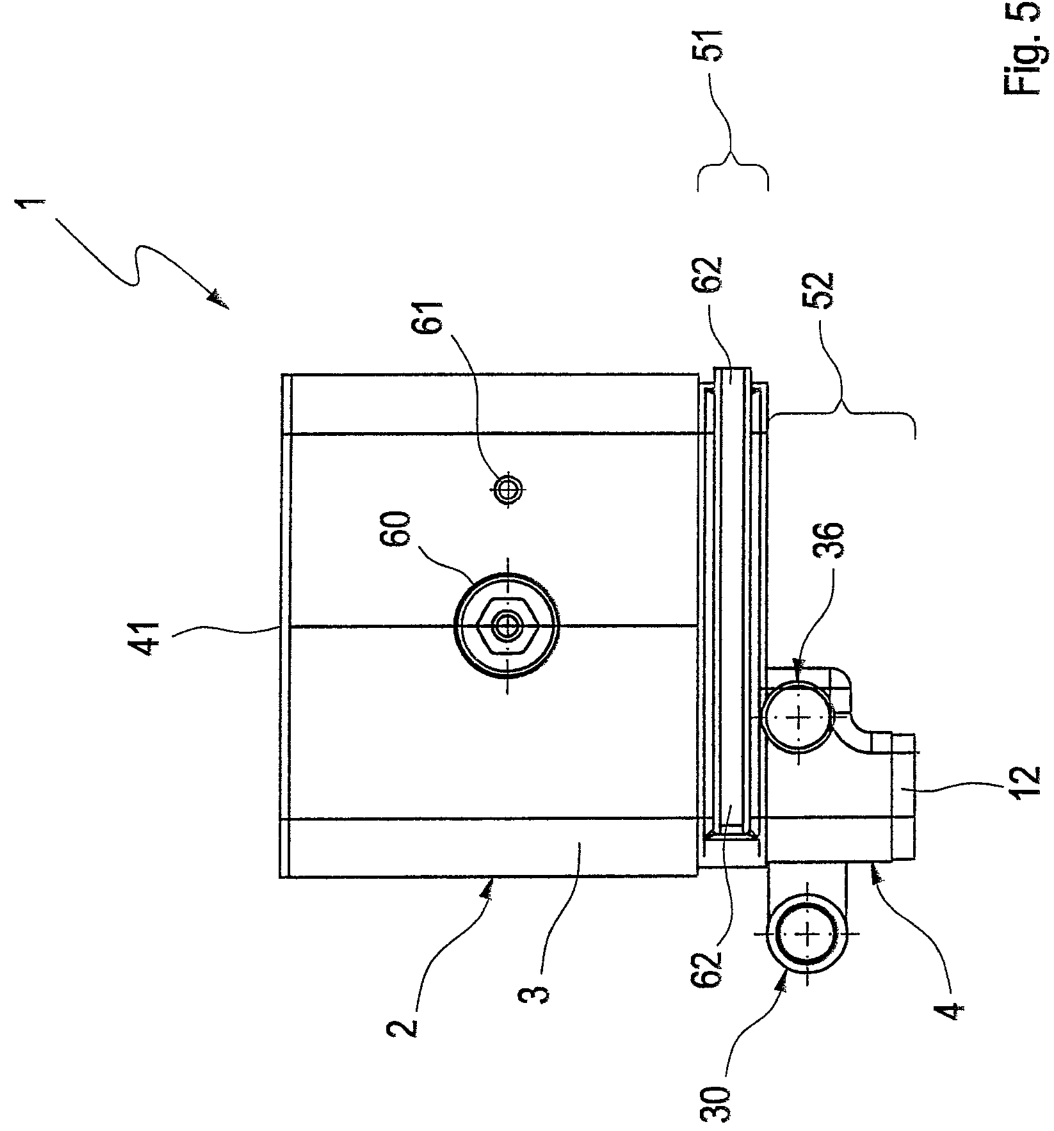
FIG. 5 is a side view of the burner corresponding to a direction of view V in FIGS. 2 and 3.
Figure 6:
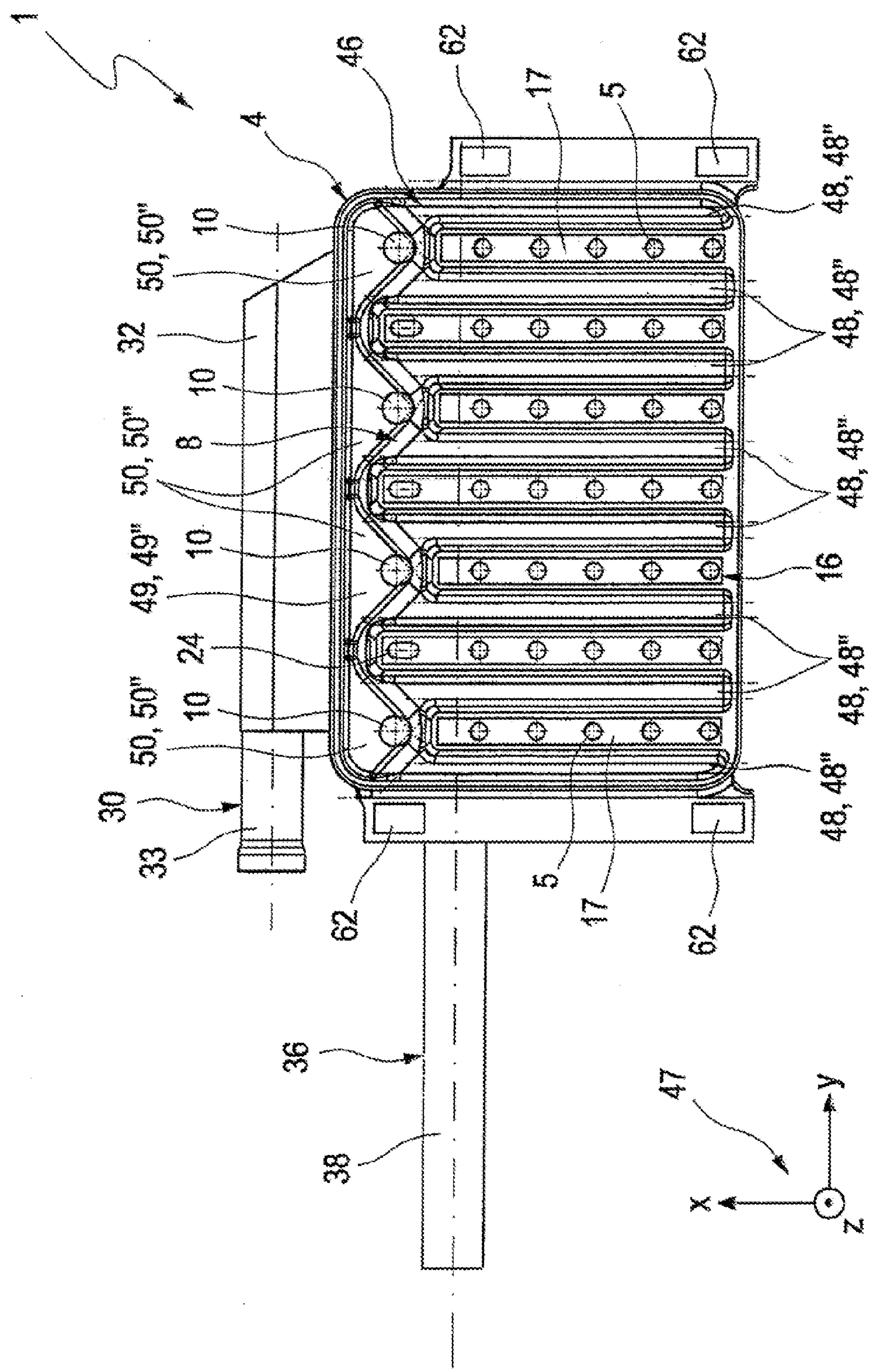
FIG. 6 is a top view of a wall structure of the burner without separating plate.

Burner 1 according to FIG. 4 is preferably part of a fuel cell system 55, which comprises, besides, at least one fuel cell 56, which is formed by a stack 57 of individual fuel cell elements 58. The fuel cell 56 comprises, besides, a port plate 59, which defines the stack 57 and has anode waste gas outlet openings and cathode waste gas outlet openings, not shown here. Burner 1 is attached here to this port plate 59 of the fuel cell stack 57. The aforementioned outlet openings of the fuel cell 56 and feed openings 9, 10 of the burner 1 are arranged complementarily to one another, such that the oxidant feed openings 9 of the burner 1 are fluidically connected with the cathode waste gas outlet openings of the fuel cell 56 in the mounted state, whereas the fuel feed openings 10 of burner 1 are fluidically connected with the anode waste gas outlet openings of the fuel cell 56. The oxidant feed openings of burner 1 advantageously have the same opening cross sections as the cathode waste gas outlet openings of the fuel cell 56. The fuel feed openings 10 of burner 1 have, in particular, the same opening cross sections as the anode waste gas outlet openings of the fuel cell 56.

In the example shown in FIG. 4, burner 1 with its port plate 12 is attached directly to the port plate 59 of the fuel cell stack 57. In addition to the port plates 12 and 59, an intermediate plate, not shown here, which has the hole pattern of the port plate 12 of burner 1, on the one hand, and the hole pattern of the port plate 59 of the fuel cell 56, on the other hand, may also be provided in another embodiment. Furthermore, this intermediate plate may be the outer contour of the port plate 59 of the fuel cell 56, i.e., it may be made congruent with this. The intermediate plate is then rigidly connected with the port plate 12 of burner 1 and can thus form a burner module, which can be arranged at the port plate 59 of the fuel cell 56, i.e., at a fuel cell module having the fuel cell 56, in an especially simple manner, especially in a detachable manner. In summary, the port plate 12 is now located at the intermediate plate and the port plate 59 at the fuel cell 56.

In addition, the combustion chamber 2 is equipped with an igniting means 60 in order to make it possible to start the combustion reaction in the combustion chamber 2. Another port 61 may be used, for example, for temperature measurement and/or pressure measurement. For example, the burner flame temperature can be monitored by means of such a temperature sensor (61), e.g., for safety monitoring of the function of the burner 1. Another port, e.g., in the area of the waste gas outlet opening 42, may be used, for example, for temperature measurement and/or pressure measurement. For example, the burner waste gas temperature can be controlled by means of such a temperature sensor (61), e.g., by regulating the fuel cell waste gases (cathode waste gas and/or anode waste gas) and/or the cooling gas (cooling air/cathode gas).

For example, a heat exchanger, not shown here, for preheating process gases, for example, cathode air, may be arranged downstream of the open area 44. The waste gas temperature of burner 3 must not exceed temperatures of 900° C. because of the material-destroying action at the heat exchanger and can be controlled, e.g., by regulating the cathode waste gas flow and the cooling gas flow.

Furthermore, straps 62 may be provided, by means of which the burner 1 can be fixed, for example, within the fuel cell system 55 relative to the fuel cell 56.

While specific embodiments of the invention have been shown and described in detail to illustrate the application of the principles of the invention, it will be understood that the invention may be embodied otherwise without departing from such principles.

What is claimed is:

1. A burner for burning a gaseous oxidant with a gaseous fuel in a combustion reaction, the burner comprising:

a combustion chamber, in which the combustion reaction takes place during the operation of the burner, the combustion chamber including a wall structure, which defines the combustion chamber on an inlet side and has oxidant openings for introducing the oxidant into said combustion chamber and fuel openings, which are separate from said oxidant openings, for introducing fuel into said combustion chamber, wherein:

said wall structure contains an oxidant distributor space, which is fluidically connected on an outlet side with said oxidant openings and said oxidant distributor space is fluidically connected on an inlet side with a plurality of oxidant feed openings;

said wall structure contains a fuel distributor space, which is fluidically separated from said oxidant distributor space and said fuel distributor space is fluidically connected on the outlet side with said fuel openings and said fuel distributor space is fluidically connected on the inlet side with a plurality of fuel feed openings;

said plurality of oxidant feed openings are formed in said wall structure on a side facing away from the combustion chamber;

said plurality of fuel feed openings are formed in said wall structure on the side facing away from the combustion chamber; and said oxidant feed openings and said fuel feed openings are arranged next to each other and alternatingly with one another in a straight connection line.

2. A burner in accordance with claim 1, wherein said oxidant feed openings and said fuel feed openings are provided in a connection area and wherein at least one of:

said connection area is formed in a flat port plate, which can be attached to a remainder of said wall structure;

said oxidant feed openings are arranged along a straight line;

said fuel feed openings are arranged along a straight line; and said oxidant feed openings and fuel feed openings are arranged next to each other and alternating with one another along a common straight line.

3. A burner in accordance with claim 1, wherein said oxidant distributor space and said fuel distributor space have a common partition and are separated from each other by said common partition from said feed openings to said inlet openings.

4. A burner in accordance with claim 3, wherein:

said partition has oxidant opening areas, in which said oxidant openings are arranged;

on a side facing said combustion chamber, said wall structure has a separating plate, which has receiving openings for receiving oxidant opening areas, so that said oxidant openings are directly exposed to the combustion chamber; and said separating plate defines said fuel distributor space and has the fuel openings.

5. A burner in accordance with claim 4, wherein:

said oxidant opening areas comprise straight strips, in which said oxidant openings are arranged next to each other along a straight line or nearly straight line;

said receiving openings have a shape complementary to that of said straight strips;

said oxidant openings are arranged next to each other along a plurality of straight lines;

said fuel openings are arranged next to each other along a plurality of straight lines;

said oxidant opening lines and said fuel opening lines extend in parallel to one another and/or alternatingly with one another; and said oxidant opening areas end aligned with said separating plate in a common plane on a side facing the combustion chamber.

6. A burner in accordance with claim 5, wherein:

said oxidant feed openings and said fuel feed openings are provided in a connection area; and said straight strips extend at right angles to said connection area.

7. A burner in accordance with claim 4, wherein:

said separating plate has a cooling area without fuel openings, said cooling area extending at right angles to an oxidant opening areas;

at least one oxidant opening area extends into said cooling area and contains at least one oxidant opening acting as a cooling gas opening in said cooling area;

a cooling wall is arranged in said combustion chamber, said cooling wall separates a combustion space from a cooling space in said combustion chamber and begins at and/or is in contact with said separating plate, so that only cooling gas openings lead to said cooling space, whereas other oxidant openings lead to said combustion space; and a height of said cooling wall, measured at right angles to said separating plate is smaller by from one third to one half of a height of said combustion chamber.

8. A burner in accordance with claim 7, wherein said oxidant feed openings and said fuel feed openings are provided in a connection area and at least one of:

said cooling area extends in parallel to said connection area; and said cooling gas openings are arranged each aligned with an oxidant feed opening.

9. A burner in accordance with claim 7, wherein:

said combustion chamber is defined on an outlet side by an end plate having at least one waste gas outlet opening and a closed area, wherein said closed area is arranged aligned with said cooling space and an open area of said end plate, which said open area contains at least one waste gas outlet opening, is arranged aligned with said combustion space; and said wall structure has, on a side facing away from said combustion chamber, a bottom plate, which defines said oxidant distributor space, wherein said bottom plate is attached to said partition.

10. A burner in accordance with claim 1, further comprising a fuel tapping port, through which fuel can be tapped from said fuel distributor space, wherein:

said fuel tapping port is fluidically connected with a plurality of tapping areas of said fuel distributor space, which are each fluidically connected with at least one fuel feed opening; and said fuel tapping port has a collector housing laterally attached to a wall structure and has a tapping tube.

11. A burner in accordance with claim 10, wherein:

said oxidant feed openings and said fuel feed openings are provided in a connection area; and said collector housing extends in parallel to said connection area.

12. A burner in accordance with claim 1, further comprising a cooling gas feed port, through which cooling gas is fed to said oxidant distributor space, wherein:

said cooling gas feed port is fluidically connected with a plurality of feed areas of said oxidant distributor space, which are each fluidically connected with at least one oxidant feed opening; and said cooling gas feed port has a feed tube, which passes through a lateral boundary of the wall structure and has in said oxidant distributor space a feed section, which has at least one opening connected fluidically with the oxidant distributor space.

13. A burner in accordance with claim 12, wherein:

said oxidant feed openings and said fuel feed openings are provided in a connection area; and said feed tube or a feed section extends in parallel to said connection area.

14. A burner in accordance with claim 1, further comprising at least one of:

a flow guide element guiding gas flow in the combustion chamber from a combustion chamber wall enclosing the combustion chamber on a side towards an inside and/or against a direction of gas flow, said flow guide being arranged in the combustion chamber, said flow guide element extending from said combustion chamber wall or at an end plate defining the combustion chamber in the direction of gas flow towards an inside and against a direction of gas flow; and a flow guide element arranged in an area of a cooling space provided in said combustion chamber;

a flow guide element arranged in an area of a combustion space provided in said combustion chamber.

15. A burner in accordance with claim 1, further comprising:

a fuel tapping port, through which fuel can be tapped from said fuel distributor space;

a cooling gas feed port, through which cooling gas is fed to said oxidant distributor space wherein:

said wall structure contains a duct system with X direction ducts, Y direction ducts and Z direction ducts, wherein first X direction ducts are fluidically connected with said oxidant openings, second X direction ducts are fluidically connected with said fuel openings, first Z direction ducts are fluidically connected with said oxidant feed openings, second Z direction ducts are fluidically connected with said fuel feed openings, a first Y direction duct fluidically connects the first X ducts with the first Z ducts and a second Y duct fluidically connects said second X ducts with said second Z ducts;

said X direction ducts, said Y direction ducts and said Z direction ducts are each essentially at right angles to each other in the manner of a Cartesian X, Y, Z system of coordinates;

said X direction ducts are arranged in a connection section of said wall structure, which said connection section extends over an entire cross section of said combustion chamber;

said Z direction ducts are arranged in another connection section of said wall structure, which said another connection section extends in the X direction over only part of the combustion chamber;

said fuel tapping port is arranged at said another connection section; and said cooling gas feed port is arranged at said another connection section.

16. A burner in accordance with claim 15, wherein said oxidant distributor space and said fuel distributor space have a common partition and are separated from each other by said common partition from said feed openings to said inlet openings and wherein at least one of:

said first X direction ducts and said second X direction ducts are separated from each other by a bicurve section of said partition, said bicurve section being in a section plane that extends at right angles to a direction of said X direction ducts; and said first and second Z direction ducts are separated from each other by another bicurve section of said partition, which said another bicurve section lies in a section plane, which extends at right angles to the direction of the Z direction ducts.

17. A burner in accordance with claim 1, further comprising at least one of:

a temperature sensor for measuring a burner waste gas temperature;

a temperature sensor for measuring a burner flame temperature; and a pressure sensor is provided for measuring a waste gas pressure of the combustion chamber.

18. A fuel cell system comprising:

a fuel cell comprising a stack of individual fuel cell elements, and a port plate defining said stack, said port plate having anode waste gas outlet openings and cathode waste gas outlet openings; and a burner comprising a combustion chamber, in which a combustion reaction takes place during the operation of said burner, said combustion chamber including a wall structure, which defines the combustion chamber on an inlet side and has oxidant openings for introducing the oxidant into the combustion chamber and fuel openings, which are separate therefrom, for introducing fuel into the combustion chamber, wherein:

said wall structure contains an oxidant distributor space, which is fluidically connected on an oxidant distributor space outlet side with the oxidant openings and said oxidant distributor space is fluidically connected on an oxidant distributor space inlet side with a plurality of oxidant feed openings, wherein said oxidant distributor space receives oxidant via at least one or more of said plurality of oxidant feed openings;

said wall structure contains a fuel distributor space, which is fluidically separated from said oxidant distributor space and said fuel distributor space is fluidically connected on a fuel distributor space outlet side with said fuel openings and said fuel distributor space is fluidically connected on a fuel space distributor inlet side with a plurality of fuel feed openings, wherein said fuel distributor space receives fuel via at least one or more of said plurality of fuel feed openings;

said plurality of oxidant feed openings are formed in said wall structure on a side facing away from the combustion chamber;

said plurality of fuel feed openings are formed in said wall structure on the side facing away from the combustion chamber;

said oxidant feed openings and said fuel feed openings are arranged next to each other and alternatingly with one another in a straight connection; and said oxidant feed openings and said fuel feed openings are arranged complementarily to said anode waste gas outlet openings and cathode waste gas outlet openings so that said oxidant feed openings are fluidically connected with said cathode waste gas outlet openings and said fuel feed openings are fluidically connected with said anode waste gas openings.

19. A fuel cell system in accordance with claim 18, wherein said oxidant feed openings and said fuel feed openings are provided in a connection area formed in a flat port plate, which can be attached to a remainder of said wall structure; and wherein at least one of:

said oxidant feed openings are arranged along a straight line;

said fuel feed openings are arranged along a straight line; and said oxidant feed openings and fuel feed openings are arranged next to each other and alternating with one another along a common straight line.

20. A fuel cell system in accordance with claim 18, wherein said burner further comprises at least one of:

a flow guide element guiding gas flow in the combustion chamber from a combustion chamber wall enclosing the combustion chamber on a side towards an inside and/or against a direction of gas flow, said flow guide being arranged in the combustion chamber, said flow guide element extending from said combustion chamber wall or at an end plate defining the combustion chamber in the direction of gas flow towards an inside and against a direction of gas flow; and a flow guide element arranged in an area of a cooling space provided in said combustion chamber;

a flow guide element arranged in an area of a combustion space provided in said combustion chamber.

* * * * *